(12) United States Patent
Kim et al.

(10) Patent No.: US 12,300,777 B2
(45) Date of Patent: May 13, 2025

(54) ELECTRODE ASSEMBLY AND METHOD FOR MANUFACTURING SAME

(71) Applicant: LG ENERGY SOLUTION, LTD., Seoul (KR)

(72) Inventors: Duck Hee Kim, Daejeon (KR); Jung Jin Kim, Daejeon (KR); Seung Jun Min, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 477 days.

(21) Appl. No.: 17/764,388

(22) PCT Filed: Oct. 7, 2020

(86) PCT No.: PCT/KR2020/013632
§ 371 (c)(1),
(2) Date: Mar. 28, 2022

(87) PCT Pub. No.: WO2021/071229
PCT Pub. Date: Apr. 15, 2021

(65) Prior Publication Data
US 2022/0344697 A1    Oct. 27, 2022

(30) Foreign Application Priority Data
Oct. 7, 2019    (KR) ........................ 10-2019-0124206

(51) Int. Cl.
*H01M 10/04*    (2006.01)
*H01M 50/531*    (2021.01)

(52) U.S. Cl.
CPC ..... *H01M 10/0431* (2013.01); *H01M 50/531* (2021.01)

(58) Field of Classification Search
CPC . H01M 10/0431; H01M 50/531; Y02E 60/10; Y02P 70/50
See application file for complete search history.

(56) References Cited

U.S. PATENT DOCUMENTS

| 6,548,204 B1 | 4/2003 | Kim et al. |
| 2005/0277021 A1 | 12/2005 | Kozuki et al. |

(Continued)

FOREIGN PATENT DOCUMENTS

| EP | 1 137 091 A1 | 9/2001 |
| JP | H10241737 A | 9/1998 |

(Continued)

OTHER PUBLICATIONS

Machine translation KR20040065788A (Year: 2004).*

(Continued)

*Primary Examiner* — Victoria H Lynch
(74) *Attorney, Agent, or Firm* — Lerner David LLP

(57) ABSTRACT

A jelly-roll type electrode assembly including a negative electrode, a first separator, a positive electrode, and a second separator that are wound together is provided. The negative electrode includes a negative electrode active material on a surface of a negative electrode collector and which has, on a first end thereof, a first negative electrode collector-exposed portion that is not coated with the negative electrode active material to expose the surface of the negative electrode collector. The negative electrode is wound together with the first separator such that the first negative electrode collector-exposed portion is disposed in a central region where the winding starts, and a negative electrode tab is coupled to the first negative electrode collector-exposed portion.

10 Claims, 7 Drawing Sheets

(56) References Cited

U.S. PATENT DOCUMENTS

| | | |
|---|---|---|
| 2013/0316207 A1 | 11/2013 | Suwa |
| 2014/0234682 A1 | 8/2014 | Kwon et al. |
| 2014/0342205 A1 | 11/2014 | Machida |
| 2014/0349179 A1 | 11/2014 | Chun |
| 2015/0037638 A1 | 2/2015 | Kim et al. |
| 2015/0295270 A1 | 10/2015 | Chun |
| 2016/0268581 A1 | 9/2016 | Ahn et al. |
| 2019/0198851 A1 | 6/2019 | Woo et al. |

FOREIGN PATENT DOCUMENTS

| | | |
|---|---|---|
| JP | 2001-266946 A | 9/2001 |
| JP | 2005-209530 A | 8/2005 |
| JP | WO2012/105362 A1 | 7/2014 |
| KR | 10-2001-0054738 A | 7/2001 |
| KR | 10-0322100 B1 | 2/2002 |
| KR | 10-2004-0065788 A | 7/2004 |
| KR | 10-2005-0096002 A | 10/2005 |
| KR | 10-0601561 B1 | 7/2006 |
| KR | 10-0833741 B1 | 5/2008 |
| KR | 10-1387424 B1 | 4/2014 |
| KR | 10-2014-0070260 A | 6/2014 |
| KR | 10-2014-0139181 A | 12/2014 |
| KR | 10-2015-0028790 A | 3/2015 |
| KR | 10-2015-0117135 A | 10/2015 |
| KR | 10-2016-0009406 A | 1/2016 |
| KR | 10-2016-0010121 A | 1/2016 |
| KR | 10-2016-0041645 A | 4/2016 |
| KR | 10-2016-0109915 A | 9/2016 |
| KR | 10-2018-0025542 A | 3/2018 |
| KR | 10-2018-0028837 A | 3/2018 |
| KR | 10-2019-0033904 A | 4/2019 |

OTHER PUBLICATIONS

Extended European Search Report for European Application No. 20873712.2, dated Dec. 12, 2022.

International Search Report for PCT/KR2020/013632 mailed on Jan. 15, 2021.

Extended European Search Report including Written Opinion for Application No. 24201211.0, dated Jan. 9, 2025. 8 pgs.

* cited by examiner

ELECTRODE ASSEMBLY AND METHOD FOR MANUFACTURING SAME

CROSS-REFERENCE TO RELATED APPLICATION

The present application claims the benefit of the priority of Korean Patent Application No. 10-2019-0124206, filed on Oct. 7, 2019, which is hereby incorporated by reference in its entirety.

TECHNICAL FIELD

The present invention relates to an electrode assembly and a method for manufacturing same and, more specifically, to: an electrode assembly in which a gap between a point, where application of a positive electrode active material starts in a central region (in a starting end) of a jelly-roll type electrode assembly manufactured in a cylindrical shape, and a point, where application of a negative electrode active material starts, may be reduced thereby to increase capacity (capable of providing a space enabling increase in length of a distal end of a positive electrode); and a method for manufacturing same.

BACKGROUND ART

Batteries for storing electric energy may be generally classified into a primary battery and a secondary battery. The primary battery is a disposable consumable battery, but on the other hand, the secondary battery is a rechargeable battery which is manufactured by using a material in which oxidation and reduction processes between electric current and substances are repeatable. That is, when the reduction reaction to the material is performed by the current, power is recharged. Also, when the oxidation reaction to the material is performed, the power is discharged. Such recharging and discharging may be performed repeatedly.

Among various types of secondary batteries, a lithium secondary battery is generally manufactured by mounting, to a case, an electrode assembly in which a positive electrode (cathode), a separator, and a negative electrode (an anode) are stacked. The recharging and discharging of the lithium secondary battery are performed while lithium ions are intercalated into the negative electrode from lithium metal oxide of the positive electrode and deintercalated therefrom repeatedly.

Also, a jelly-roll (winding) method, a stacking method, a stacking and folding method, and the like are well-known as methods for manufacturing the electrode assembly. In the jelly-roll (winding) method, a separator is stacked between the negative electrode and the positive electrode and then rolled. In the stacking method, a negative electrode and a positive electrode are cut into desired width and length and then the negative electrode, a separator, and the negative electrode are repeatedly stacked. In the stack and folding method, unit cells are placed side by side on a folding separator and then folded from one side.

Among the electrode assemblies, a jelly-roll type electrode assembly is manufactured by winding a positive electrode 4, a separator 2, and a negative electrode 3 together around a winding core 1.

Herein, as illustrated in FIG. 1A, separators 2a and 2b are input to the winding core 1 first, and then, the negative electrode 3 and the positive electrode 3 are input sequentially. That is, in the method for manufacturing the jelly-roll type electrode assembly, the winding core 1 is rotated in a state in which starting ends (ends in which the winding starts) of two sheets of separators 2a and 2b are overlapped on each other and fixed to the winding core 1. Then, the negative electrode 3 is input, and after a predetermined time is elapsed, the positive electrode 4 is input.

When the winding core 1 is rotated by a predetermined number of revolutions in a state where the positive electrode 4 is input, a configuration is obtained in which the starting ends of the separators 2a and 2b are positioned in the centermost region of the completed cylindrical electrode assembly, a starting end of the negative electrode 3 is positioned outward from the starting ends of the separators 2a and 2b at the center, and a starting end of the positive electrode 4 is positioned outward from the starting end of the negative electrode 3.

Here, the positive electrode is manufactured to have a length less than that of the negative electrode, and thus, the capacity of the manufactured electrode assembly is proportional to the length of the positive electrode 4, more specifically, to an area of the positive electrode 4 in which a positive electrode active material 4b is applied to a surface of a positive electrode collector 4a. Thus, it is advantageous in terms of capacity to apply the positive electrode active material 4b to the surface of the positive electrode collector 4a as wide as possible. However, as illustrated in FIG. 1B showing a state where the used electrode assembly is dissembled, when heat is concentrated in the center of the electrode assembly, the separator 2 is thermally contracted in the starting end of the positive electrode 4, and accordingly, a short circuit may occur due to the contact between the positive electrode 4 and the negative electrode 3.

Thus, the positive electrode 4 is input later than the negative electrode 3 when winding so as to prevent the internal short circuit. Also, as illustrated in FIG. 1C comparing the negative electrode 3 and the positive electrode 4 that are input in a manufacturing method of the related art, the negative electrode 3 has a portion from the starting end to a certain point which is not coated with a negative electrode active material 3b, and the positive electrode 4 is input after a certain distance (a gap) from the point where the application of the negative electrode active material 3b starts (that is, the electrode assembly is manufactured such that there is a certain gap between a point where the application of the negative electrode active material starts in the negative electrode and a point where the application of the positive electrode active material starts in the positive electrode). Here, a collector-exposed portion not coated with the negative electrode active material 3b in the negative electrode collector 3a is formed in each of the starting end (an end adjacent to the winding core) of the negative electrode 3 and the terminal end (an end in the outermost region). The terminal end collector-exposed portion of the negative electrode 3 has an area wider than that of the starting end collector-exposed portion, and the terminal end collector-exposed portion is bonded to a negative electrode tab 3c so as to be connected to the outside. Also, the positive electrode 4 has a length less than the negative electrode 3, a collector-exposed portion not coated with the positive electrode active material 4b in the positive electrode collector 4a is formed in a predetermined position between both ends, and a structure is provided in which a positive electrode tab 4c is bonded to the collector-exposed portion.

The electrode assembly in which the negative electrode 3 and the positive electrode 4 having the structures described above are wound may ensure safety in proportion to a distance difference D between the positive electrode 4 and the negative electrode 3.

That is, when the distance difference D is increased by shortening the positive electrode, the positive electrode does not contact the negative electrode even when the separator is contracted in a core part, and thus, the safety for the ignition is improved. However, the size of the positive electrode 4 is relatively reduced, causing a loss in capacity. Also, the positive electrode does not face a negative electrode active material-coated portion of the negative electrode 3 (in particular, a negative electrode active material-coated portion in a gap region of FIG. 1C), which is positioned in a region of the distance difference D at the winding central portion and coated with the negative electrode active material. Thus, there is a problem in that the negative electrode active material is wasted without producing electricity.

Also, the negative electrode tab 3c is bonded to the center of a can for the safety. However, as the negative electrode tab 3c is bonded to the terminal end collector-exposed portion of the negative electrode 3 (as the negative electrode tab is disposed in an outer portion of the electrode assembly), the negative electrode tab 3c has to be long so as to be connected to the center of the can when the negative electrode tab 3c is welded to a battery can. Thus, there is a problem in that internal resistance (direct current internal resistance (DCIR) and alternating current internal resistance (ACIR)) is unnecessarily increased.

DISCLOSURE OF THE INVENTION

Technical Problem

Thus, the main object of the present invention is to provide an electrode assembly and a method for manufacturing same, in which a length of a positive electrode may be increased without deterioration in safety to maximize a capacity, and a welding distance of a negative electrode tab may be reduced to lower resistance.

Technical Solution

To achieve the above-described object, the present invention provides a method for manufacturing a jelly-roll type electrode assembly which is manufactured by winding a negative electrode, a first separator, a positive electrode and a second separator around a winding core, the method comprising: a negative electrode rotating step (S1) of inputting a negative electrode onto the second separator and allowing the negative electrode to rotate such that rotation around the winding core is performed from a starting end of the negative electrode; and a positive electrode inputting step (S2) of inputting a positive electrode onto the second separator after the rotation of the negative electrode starts and thereby allowing the positive electrode to rotate together with the negative electrode, wherein the negative electrode is manufactured by applying a negative electrode active material to a surface of a negative electrode collector, wherein a first negative electrode collector-exposed portion, which is not coated with the negative electrode active material to expose the surface of the negative electrode collector, is formed in the starting end fixed to the winding core, and a negative electrode tab is bonded to the first negative electrode collector-exposed portion.

A second negative electrode collector-exposed portion is formed in a terminal end of the negative electrode opposite from the starting end, wherein, in the negative electrode rotating step (S1), the rotation starts from the first negative electrode collector-exposed portion to the second electrode negative electrode collector-exposed portion, and wherein the first negative electrode collector-exposed portion has a larger area than an area of the second negative electrode collector-exposed portion.

Also, to achieve the above-described object, the present invention also provides an electrode assembly. An electrode assembly according to the present invention is a jelly-roll type electrode assembly comprising a negative electrode, a first separator, a positive electrode, and a second separator that are wound together, wherein the negative electrode includes a negative electrode active material on a surface of a negative electrode collector and which has, formed on a first end thereof, a first negative electrode collector-exposed portion that is not coated with the negative electrode active material to expose the surface of the negative electrode collector, and wherein the negative electrode is wound together with the first separator such that the first negative electrode collector-exposed portion is disposed in a central region where the winding starts, and a negative electrode tab is coupled to the first negative electrode collector-exposed portion.

A second negative electrode collector-exposed portion is formed on a second end of the negative electrode collector opposite the first end, and wherein the first negative electrode collector-exposed portion has a larger area than an area of the second negative electrode collector-exposed end.

Also, the first negative electrode collector-exposed portion is electrically connected to a negative electrode terminal (mounted to a can or a case in which the electrode assembly is accommodated) through the negative electrode tab.

The negative electrode tab is coupled to the first negative electrode collector-exposed portion while protruding in a width direction of the negative electrode.

Here, the positive electrode is shorter than the negative electrode so that the winding of the positive electrode starts later than the winding of the negative electrode when the winding of the negative electrode, the first separator, the positive electrode, and the second separator starts, and wherein the winding of the positive electrode is completed earlier than the winding of the negative electrode.

The winding is performed so that first and second ends of the positive electrode are spaced certain distances from the first and second negative electrode collector-exposed portions, respectively. Here, the distances may be changed according to the specifications of the electrode assembly to be manufactured.

The positive electrode includes a positive electrode active material on a surface of a positive electrode collector and has, formed therein, a positive electrode collector-exposed portion that is not coated with the positive electrode active material to expose the surface of the positive electrode collector, and wherein the positive electrode collector-exposed portion is disposed between two regions of the positive electrode collector coated with the positive electrode active material.

It is desirable that an area of the positive electrode collector-exposed portion is less than the area of the first negative electrode collector-exposed portion and is greater than the area of the second negative electrode collector-exposed portion.

The positive electrode collector-exposed portion is disposed closer to the first negative electrode collector-exposed portion than to the second negative electrode collector-exposed portion.

The electrode assembly having the structure described above is accommodated in a case to manufacture a secondary battery.

Advantageous Effects

In the electrode assembly of the present invention having the structure described above, the negative electrode tab is placed in the center of the electrode assembly, and thus, the negative electrode tab may decrease in length when welded to the can. Accordingly, the unnecessary increase in resistance may be reduced.

In particular, according to the present invention, the negative electrode collector-exposed portion positioned in the starting end (the end placed in the winding center) has the area greater than the area of the negative electrode collector-exposed portion positioned in the terminal end (the end placed in the outer portion of the electrode assembly), and thus, the gap between the point where the application of the negative electrode active material starts in the starting end and the point where the application of the positive electrode active material starts in the starting end may be reduced compared to the structure of the related art (that is, the length of the positive electrode may be increased compared to the structure of the related art). Therefore, the capacity of the electrode assembly may increase.

MODE FOR CARRYING OUT THE INVENTION

Hereinafter, the present invention will be described in detail with reference to the accompanying drawings so that the present invention can be easily carried out by a person skill in the art to which the present invention pertains. However, the present invention may be embodied in several different forms, and not be limited to the embodiments set forth herein.

A part unrelated to the description will be omitted so as to clearly describe the present invention, and the same reference symbols are affixed to identical or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an electrode assembly, in which a capacity may be increased while internal resistance is reduced, and a method for manufacturing same. Hereinafter, embodiments according to the present invention will be described in more detail with reference to the accompanying drawings.

First Embodiment

The present invention provides, as a first embodiment, a method for manufacturing a jelly-roll type electrode assembly which is manufactured by winding a negative electrode 30, a separator 20 (20a and 20b), and a positive electrode 40 around a winding core.

Figure 2:
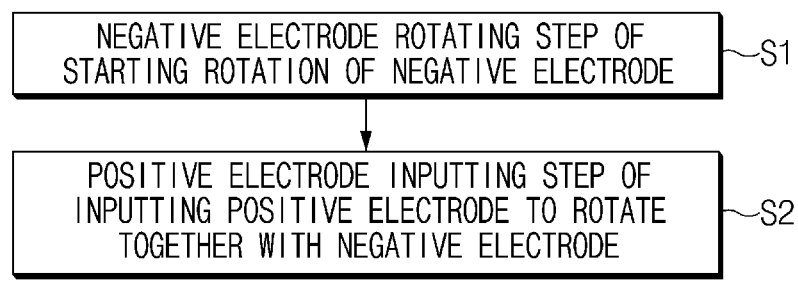
FIG. 2 is a flowchart of steps applied in a method for manufacturing an electrode assembly according to the present invention.
Figure 3:
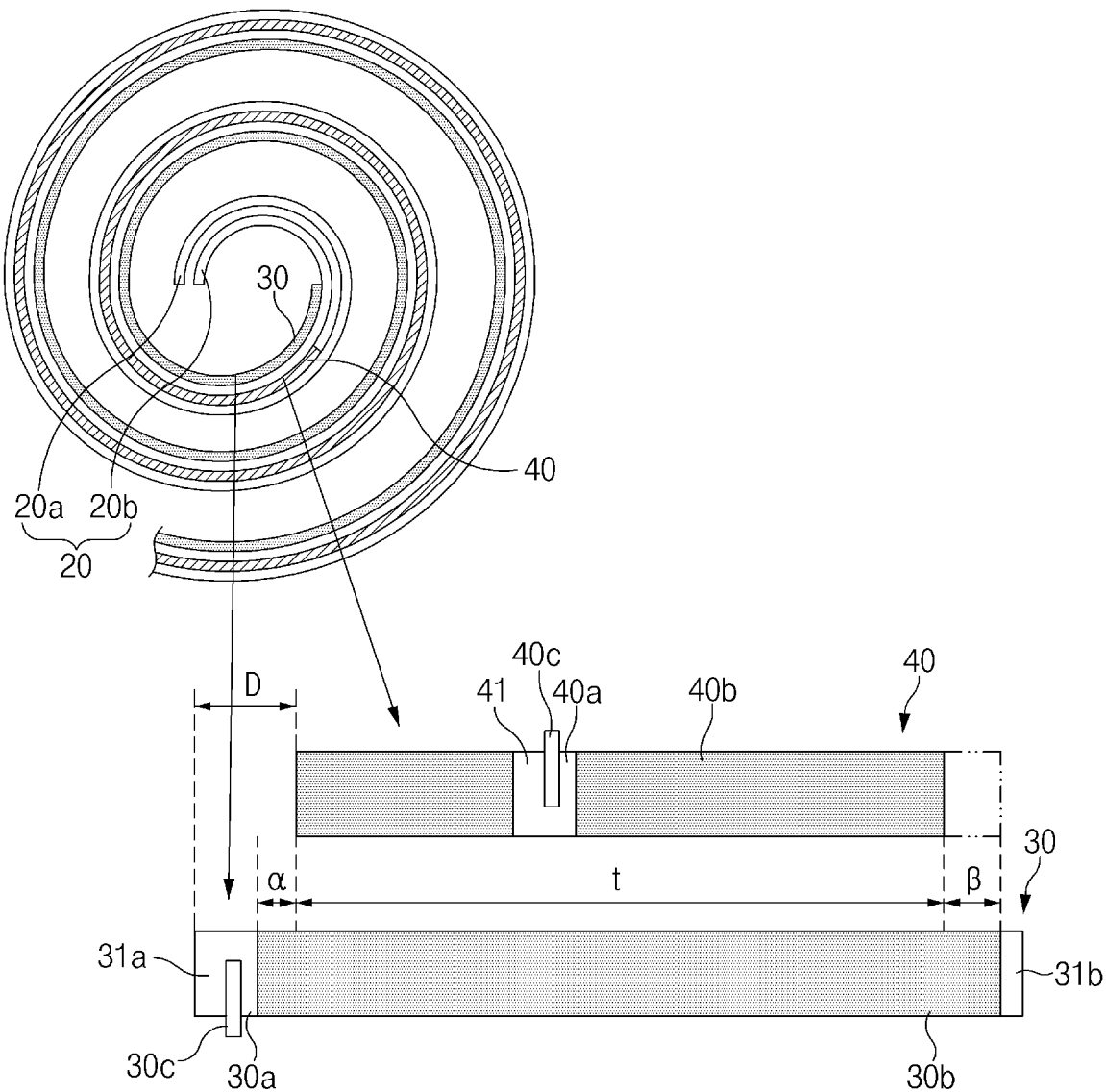
FIG. 3 is a view illustrating a state (a lower figure) in which a positive electrode and a negative electrode, which are input in an electrode assembly according to the present invention, are compared and a state (an upper figure) in which the negative electrode and the positive electrode are positioned in the electrode assembly (FIG. 3 illustrates that a space is provided inside while the negative electrode, the separator, and the positive electrode rotate, but components are intentionally illustrated as being separated from each other because it is difficult to identify the components when the lines thereof in the drawing appear to stick together. That is, during the rotation, the negative electrode, the separator, and the positive electrode are wound in a closely packed cylindrical shape while actually attached to each other).

FIG. 2 is a flowchart of steps applied in a method for manufacturing an electrode assembly according to the present invention. FIG. 3 is a view illustrating a state (a lower figure) in which a positive electrode and a negative electrode, which are input in an electrode assembly according to the present invention, are compared and a state (an upper figure) in which the negative electrode and the positive electrode are positioned in the electrode assembly. For reference, FIG. 3 illustrates that a space is provided inside while a negative electrode 30, a separator 20, and a positive electrode 40 rotate, but components are intentionally illustrated as being separated from each other because it is difficult to identify the components when the lines thereof in the drawing appear to stick together. That is, during the rotation, the negative electrode 30, the separator 20, and the positive electrode 40 are wound in a closely packed cylindrical shape while actually attached to each other.

Figure 1A:
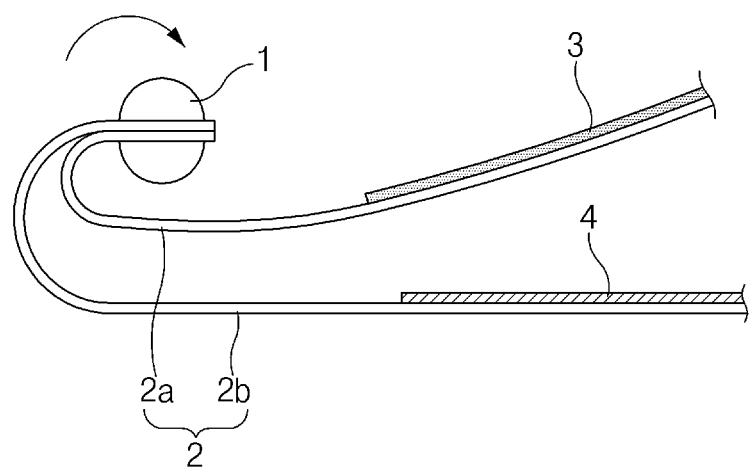
FIG. 1A is a view illustrating a state in which two sheets of separators are fixed to a winding core first, and then, a negative electrode and a positive electrode are sequentially input.

Referring to FIGS. 2 and 3, the present invention is manufactured such that two sheets of separators 20a and 20b are fixed to a winding core first as in the related art, and then, the negative electrode 30 is input first and the negative electrode 40 is input later (see the configuration of FIG. 1A). In the negative electrode 30 which is input in the present invention, a negative electrode tab 30c is bonded to a negative electrode collector-exposed portion, and the negative electrode collector-exposed portion to which the negative electrode tab 30c is bonded is positioned in a starting end (a left end of FIG. 3 as an end disposed adjacent to a winding core) of the negative electrode 30 so that the negative electrode tab 30c is positioned in a central region of the electrode assembly.

That is, in the manufacturing method of the present invention, the two sheets of separators 20a and 20b are fixed to the winding core first and wound therearound in the same manner as the related art. Then, the negative electrode 30 is input between the separators 20a and 20b or while being in contact with one of the separators 20a and 20b. A negative electrode rotating step (S1) is performed in which the negative electrode 30 rotates around the winding core together with the separators 20a and 20b.

Also, the rotation of the negative electrode 30 starts, and after a small time difference, the positive electrode 40 is inputted. Here, the small time difference is a time difference enough to be able to form a distance difference D between the starting end (the left end in FIG. 3) of the negative electrode 30 and the starting end (the left end in FIG. 3) of the positive electrode 40 may be formed as illustrated in FIG. 3.

A positive electrode inputting step (S2) is performed in which, after the rotation of the negative electrode 30 starts, the positive electrode 40 is input to rotate together with the negative electrode 30. Then, when the winding core is rotated by a predetermined number of revolutions, the winding of the positive electrode 40, the negative electrode 30, and the separators 20 which have been input is completed.

Also, the negative electrode 30 according to the present invention is manufactured by applying a negative electrode active material 30b to a surface of a negative electrode collector 30a, and a negative electrode collector-exposed portion 31a, which is not coated with the negative electrode active material to expose the surface of the negative electrode collector 30a, is formed in the starting end fixed to the winding core.

As illustrated in FIG. 3, the negative electrode collector-exposed portion 31a is also formed in the terminal end of the negative electrode 30 as well as in the starting end. The negative electrode collector-exposed portion 31a formed in the starting end has an area greater than an area of the negative electrode collector-exposed portion 31b formed in the terminal end, and is bonded to the negative electrode tab 30c.

That is, in the manufacturing method according to the embodiment, the rotation starts from the negative electrode collector-exposed portion 31a having a larger area among the negative electrode collector-exposed portions 31a and 31b. In the negative electrode rotating step (S1), the rotation starts from the negative electrode collector-exposed portion 31a having a larger area.

The present invention having the structure described above may reduce a negative electrode active material-coated portion which is wasted in a region of a distance difference D between the positive electrode and the negative electrode at the winding central portion. That is, instead of applying the negative electrode active material to a region (a gap region of FIG. 1C) that does not react, the negative electrode collector-exposed portion is formed in the region. Also, the negative electrode active material is additionally applied to a region of negative electrode collector-exposed portion formed in the winding terminal end of the negative electrode of the related art. Thus, with respect to an application length ($\beta$ of FIG. 3) of the negative electrode active material additionally applied to the winding terminal end, the length of a portion of the terminal end of the positive electrode in which the positive electrode active material is applied may be increased by $\beta$. Electricity may be generated more by the extended reaction length $\beta$. Accordingly, the battery capacity may be further increased compared to the related art.

Here, since the safety of the battery for the positive-negative electrode short circuit is determined by the positive-negative electrode distance difference D, the distance difference of the positive electrode and the negative electrode is maintained at D so as to maintain the safety, and the length of the positive electrode may further extended to $t+\beta$ in the first embodiment of the present invention.

Second Embodiment

In addition, the present invention provides, as a second embodiment, an electrode assembly which may be manufactured by the manufacturing method describe above.

The electrode assembly according to the present invention is a jelly-roll type electrode assembly in which the negative electrode 30, the separator 20, the positive electrode 40 are stacked, wound from the center, and then manufactured in a cylindrical shape. Unlike the related art, the negative electrode tab 30c is disposed in or around the center of the cylindrical electrode assembly.

In an embodiment, the negative electrode 30 is manufactured by applying the negative electrode active material 30b to the surface of the negative electrode collector 30a, and the negative electrode collector-exposed portions 31a and 31b, which are not coated with the negative electrode active material 30b to expose the surface of the negative electrode collector 30a, are formed at both ends (that is, the starting end disposed close to the winding core, and the terminal end opposite thereto).

Here, the negative electrode collector-exposed portion 31a formed in the starting end has an area greater than an area of the negative electrode collector-exposed portion 31b formed in the terminal end, and the negative electrode tab 30c may be bonded to the negative electrode collector-exposed portion 31a formed in the starting. The negative electrode tab 30c is bonded to the negative electrode collector-exposed portion 31a formed in the starting end of the negative electrode 30, and the negative electrode tab 30c is coupled to the negative electrode collector-exposed portion 31a while protruding in a width direction of the negative electrode 30. Also, the negative electrode tab 30c is electrically connected to a negative electrode terminal (mounted to a can or a case in which the electrode assembly is accommodated).

Here, the positive electrode 40 is shorter than the negative electrode 30 so that, during the manufacturing process, the winding of the positive electrode 40, which is wound with the separator 20 therebetween, starts later than the winding of the negative electrode 30 and is completed earlier than the winding of the negative electrode 30. Also, the winding is performed so that both ends of the positive electrode 40 are spaced certain distances from the negative electrode collector-exposed portions 31a and 31b, respectively, formed on both the ends of the negative electrode 30.

That is, as illustrated in FIG. 3, the positive electrode 40 has a gap $\alpha$ with respect to the starting end of the positive electrode 40 due to the existence of the negative electrode collector-exposed portion 31a positioned in the starting end of the negative electrode 30. Also, when the length of the positive electrode of the related art is t (see FIG. 1C), the positive electrode extends by $\beta$ corresponding to the extended length of the negative electrode active material and thus may have the length of $t+\beta$.

In the present invention, the negative electrode collector-exposed portion 31a having a larger area is positioned in the starting end of the negative electrode 30, and thus, the negative electrode active material remaining in the amount corresponding to the length of the negative electrode collector-exposed portion 31a may be applied to the terminal end of the negative electrode. Accordingly, the terminal end of the positive electrode 40 may be extended, and the length of the positive electrode may be maximized. In this case, a gap α between the negative electrode active material and the positive electrode active material in the starting end in the present invention may be smaller than the gap of the structure of the related art. The gap α between the negative electrode active material and the positive electrode active material represents a wasted region, and thus, the waste may be reduced in the present invention compared to the related art.

Figure 1B:
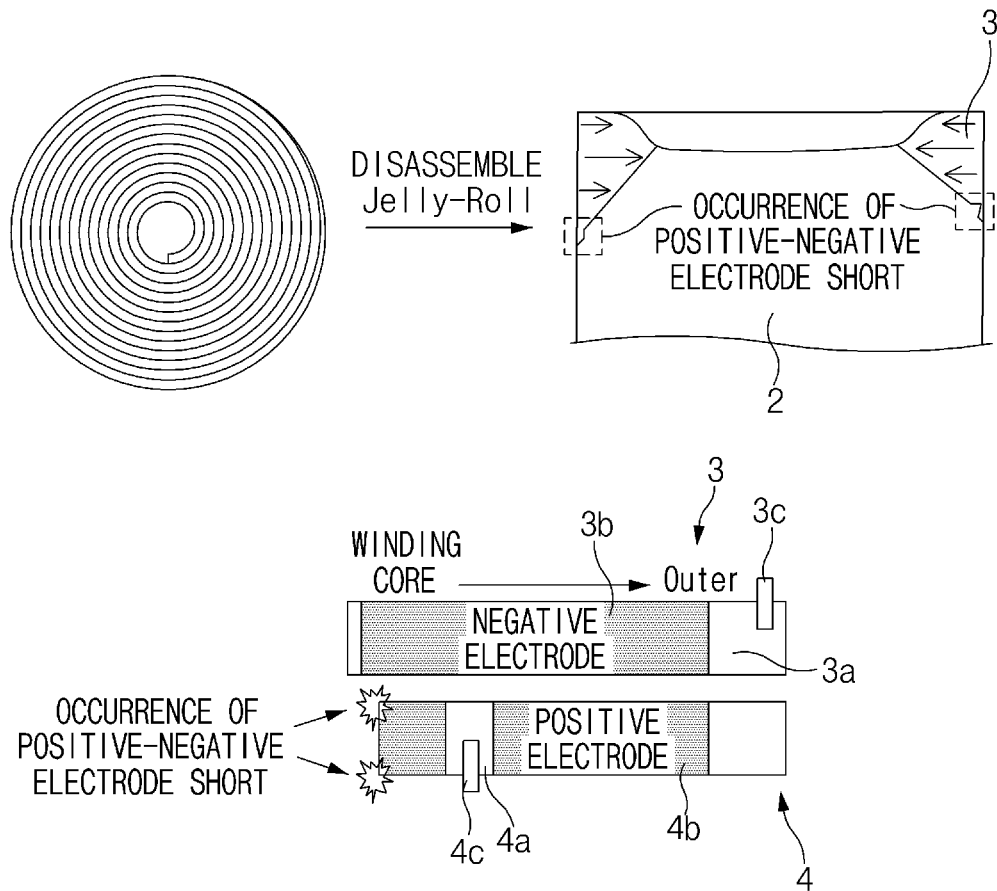
FIG. 1B is a view illustrating a state (an upper figure) in which a used jelly-roll type electrode assembly is disassembled and unfolded and a state (a lower figure) in which the disassembled negative electrode and positive electrode are compared.
Figure 1C:
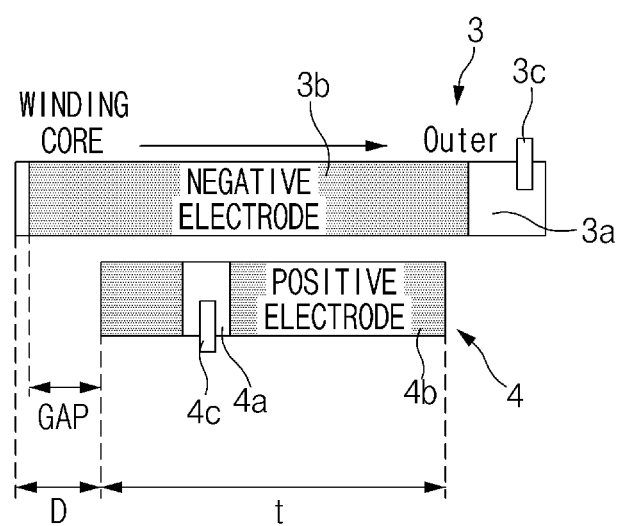
FIG. 1C is a view comparing a negative electrode and a positive electrode which are input in a method for manufacturing a jelly-roll type electrode assembly of the related art.

As illustrated in FIGS. 1C and 3, a gap D is created for the safety (that is, the prevention of short circuit) by a predetermined distance (irrespective of the area of the negative electrode collector-exposed portion) between the starting end of the negative electrode 30 and the starting end of the positive electrode 40. Here, in the structure of the related art in FIG. 1C, the negative electrode active material is applied to a region closer to the starting end of the negative electrode. On the other hand, in the structure of the embodiment in FIG. 3, the negative electrode active material is applied from a region relatively away from the starting end of the negative electrode.

Thus, in a state where the gap D between the starting end of the negative electrode 30 and the starting end of the positive electrode 40 is fixed for the safety, the negative electrode active material is disposed closer to the starting end in the structure of FIG. 1C. Thus, the gap between the point where the application of the negative electrode active material starts and the point where the application of the positive electrode active material starts becomes larger than that of the structure in FIG. 3. That is, the region having the gap is a region in which only the negative electrode active material is applied, and is a wasted region which is not involved in the charging and discharging of the electrode assembly. However, the distance of the wasted region is reduced to a in the embodiment, and according to the reduced size a, the length of the negative electrode active material applied to the terminal end of the negative electrode 30 is increased by β. Thus, the capacity may increase (That is, the gap of FIG. 1C may be the sum of α and β). Thus, in a state in which the length of the negative electrode 30 does not change, a region to which the negative electrode active material is applied is relatively further extended in the terminal end of the negative electrode 30. Thus, the length of the positive electrode 40 may be extended by the length in which the application of the negative electrode active material is extended, as long as being shorter than the negative electrode 30. Accordingly, the capacity of the electrode assembly may increase.

Here, the size of a may be determined according to a manufacturing process. For example, the winding core having the sufficiently small size is used (condition 1), the application thickness of electrode active material has the uniformity over a certain level (condition 2), and a coating starting point difference is adjusted on both the surfaces of the electrode (condition 3). Under the above conditions, the size of a may have a value of 0.9 to 1.1 mm which is smaller than that of the structure of the related art.

When the size of a is reduced to 0.9 to 1.1 mm as described above, the capacity of battery may increase by 3.2 to 3.4%, and the energy density per volume may increase by 2 to 2.2%.

Also, like the negative electrode 30, the positive electrode 30 is manufactured by applying the positive electrode active material 40b to the surface of the positive electrode collector 40a, and a positive electrode collector-exposed portion 41, which are not coated with a positive electrode active material 40b to expose the surface of the positive electrode collector 40a, is formed. A positive electrode tab 40c is bonded to the positive electrode collector-exposed portion 41, and the positive electrode tab 40c is bonded while protruding in a direction opposite to the negative electrode tab 30c.

Unlike the negative electrode collector-exposed portions 31a and 31b, the positive electrode collector-exposed portion 41 is disposed between two regions which are coated with the positive electrode active material 40b in the positive electrode collector 40a and separated from each other. The area and position of the positive electrode collector-exposed portion 41 is not limited within a specific range, but it is desirable that the positive electrode collector-exposed portion 41 has an area less than that of the negative electrode collector-exposed portion 31a having the larger area among the negative electrode collector-exposed portions 31a and 31b and greater than that of the negative electrode collector-exposed portion 31b having the smaller area among the negative electrode collector-exposed portions 31a and 31b. In addition, the positive electrode collector-exposed portion 41 is disposed closer to the negative electrode collector-exposed portion 31a having the larger area among the negative electrode collector-exposed portions 31a and 31b than the negative electrode collector-exposed portion 31b having the smaller area.

Also, the electrode assembly having the structure described above is accommodated in a case to manufacture a secondary battery.

In the electrode assembly of the present invention having the structure described above, the negative electrode tab 30c is placed in the center of the electrode assembly, and thus, the negative electrode tab 30c may decrease in length when welded to the can. Accordingly, the unnecessary increase in resistance may be reduced.

Figure 4:
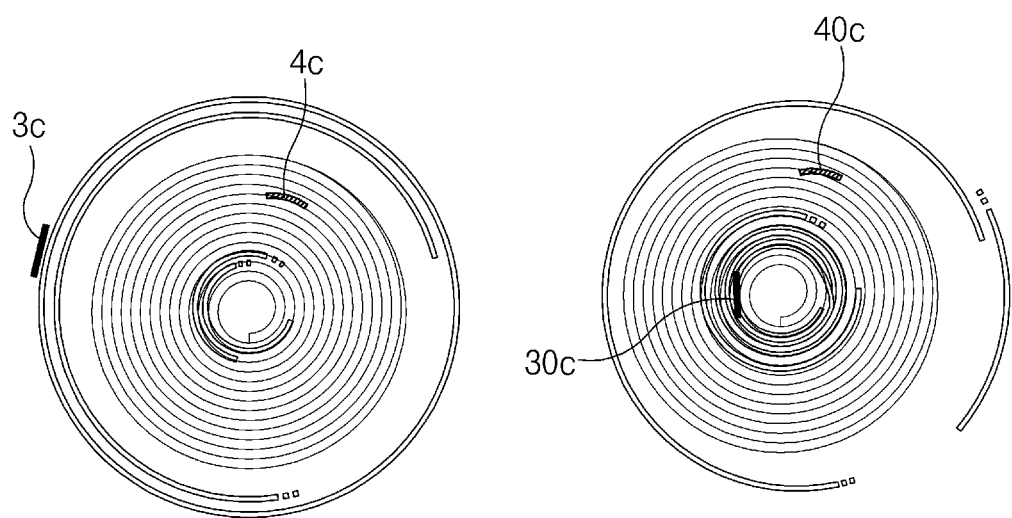
FIG. 4 is a view illustrating a state (a left figure) in which a negative electrode tab and a positive electrode tab are positioned in an electrode assembly of the related art and a state (a right figure) in which a negative electrode tab and a positive electrode tab are positioned in an electrode assembly according to the present invention.

As illustrated in FIG. 4 showing a state (a left figure) in which the negative electrode tab 3c and the positive electrode tab 4c are positioned in an electrode assembly of the related art and a state (a right figure) in which the negative electrode tab 30c and the positive electrode tab 40c are positioned in the electrode assembly according to the present invention, the negative electrode tab 30c is positioned close to the center of the electrode assembly in the structure of the present invention. Thus, welding may be performed directly on the bottom surface of the can to reduce the length, and accordingly, the increase in resistance may be reduced.

In particular, according to the present invention, the negative electrode collector-exposed portion 31a positioned in the starting end (the end placed in the winding center) has the area greater than the area of the negative electrode collector-exposed portion 31b positioned in the terminal end (the end placed in the outer portion of the electrode assembly), and thus, the waste between the positive electrode 40 and the negative electrode 30 in the starting end may be reduced compared to the structure of the related art (that is, the length of the positive electrode may be increased compared to the structure of the related art). Therefore, the capacity of the electrode assembly may increase.

Experiment

Figure 5:
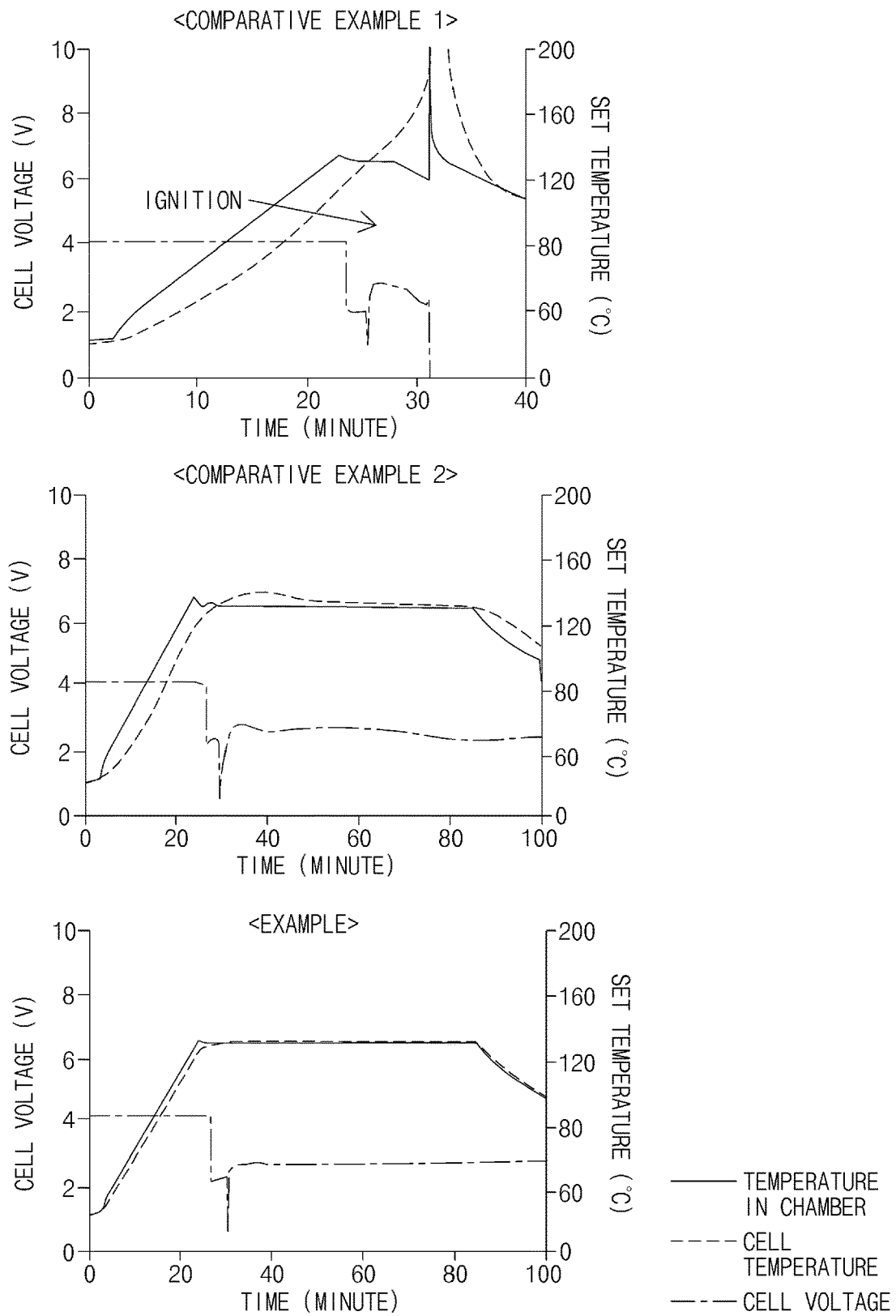
FIG. 5 is a view illustrating graphs for comparing experimental results of an electrode assembly (Example) according to the present invention and electrode assemblies (Comparative examples 1 and 2) of the related art.

FIG. 5 is a view illustrating graphs for comparing experimental results of an electrode assembly (Example) according to the present invention and electrode assemblies (Comparative examples 1 and 2) of the related art.

The embodiment is the electrode assembly, having a structure as illustrated in FIG. 3, in which the negative electrode collector-exposed portion 31a having the larger area is positioned in the center of the electrode assembly and the negative electrode tab 30c is disposed close to the center. Also, Comparative example 1 is the electrode assembly, having the structure of the related art as illustrated in FIG. 1B, in which the negative electrode tab is disposed in an outer portion of the electrode assembly. Comparative example 2 is the electrode assembly having the same structure of the relate dart as Comparative example 1, but a gap between the positive electrode and the negative electrode is further extended (a structure in which the gap increases by 5 mm compared to Comparative example 1. That is, a structure in which the length of the positive electrode is further reduced in the structure of FIG. 1B) (Comparative example 2 corresponds to FIG. 1C, and comparative example 2 has a structure in which the positive-negative electrode gap D is extended to a degree to prevent the short circuit). Also, in this experiment, the length of the positive electrode inside the electrode assembly of Comparative example 1 is the same as the length of the positive electrode inside the electrode assembly of Example. The length of the positive electrode in Comparative example 2 is reduced by the increase in gap between the positive electrode and the negative electrode.

Each of the electrode assemblies is manufactured in a jelly-roll type and then inserted into a cylindrical can. Subsequently, an electrolyte is injected therein. Experiments were performed with cylindrical secondary batteries manufactured by a conventional method described above.

The experiment condition is that each of the secondary batteries is placed in a closed chamber and heated at a rate of 5° C./min. Also, the temperature was maintained when reaching 130° C.

As illustrated in FIG. 5, in the secondary battery of Comparative example 1, the temperature reached 130° C. on about 22 to 23 minutes and was maintained for 10 minutes. Ignition occurred, and cell voltage became 0V. Also, in the secondary battery of Comparative example 2 and the secondary battery according to Example of the present invention, it may be found that the temperature reached 130° C. and ignition did not occur for one hour or more.

That is, comparing Comparative example 1 and Comparative example 2, it may be found that the safety for ignition increases when the gap between the negative electrode and the positive electrode increases in the related art. However, in the structure of Comparative example 2, the length of the positive electrode became shorter as the gap increased. Accordingly, the total capacity was decreased. However, in the structure of Example of the present invention, it may be found that the gap is increased without reducing the length of the present invention (without reduction in capacity) to obtain of improving the safety for ignition.

In addition, Table 1 below shows relative values of energy density and DCIR for Comparative example 1 and Example when the energy density of Comparative example 2 is B and DCIR is C.

TABLE 1

|  | Comparative example 1 | Comparative example 2 | Example |
| --- | --- | --- | --- |
| Energy density (Wh/L) | B + 7 | B | B + 7 |
| DCIR (mohm) | C | C | C − 5 |

As shown in Table 1, the energy density of Example is equivalent to that of Comparative example 1, and a value of DCIR of Example was measured to be smaller than those of Comparative example 1 and Comparative example 2.

Consequently, from FIG. 5 and Table 1, the electrode assembly according to Example of the present invention has the same length as the electrode assembly of Comparative example 1, and thus, the same energy density may be achieved. Also, Example of the present invention may have the safety for ignition equivalent to Comparative example 2 (having an advantage of increasing the gap between the negative electrode and the positive electrode and thereby improving the safety for ignition, but having a disadvantage of decreasing the energy density). Also, the negative electrode tab is moved to the center, and thus, the length thereof is reduced. Accordingly, there may be a secondary effect of reducing internal resistance.

Although the present invention is described by specific embodiments and drawings, the present invention is not limited thereto, and various changes and modifications may be made by a person skilled in the art to which the present invention pertains within the technical idea of the present invention and equivalent scope of the appended claims.

DESCRIPTION OF THE SYMBOLS

20: Separator
30: Negative electrode
40: Positive electrode

The invention claimed is:

1. A jelly-roll type electrode assembly comprising a negative electrode, a first separator, a positive electrode, and a second separator that are wound together,
    wherein the negative electrode includes a negative electrode active material on a surface of a negative electrode collector and which has, on a first end thereof, a first negative electrode collector-exposed portion that is not coated with the negative electrode active material to expose the surface of the negative electrode collector,
    wherein the negative electrode is wound together with the first separator such that the first negative electrode collector-exposed portion is disposed in a central region where the winding starts, and a negative electrode tab is coupled to the first negative electrode collector-exposed portion,
    wherein a second negative electrode collector-exposed portion is formed on a second end of the negative electrode collector opposite the first end, and
    wherein the first negative electrode collector-exposed portion has a larger area than an area of the second negative electrode collector-exposed portion.

2. The electrode assembly of claim 1,
    wherein the first negative electrode collector-exposed portion is electrically connected to a negative electrode terminal through the negative electrode tab.

3. The electrode assembly of claim 2, wherein the negative electrode tab is coupled to the first negative electrode collector-exposed portion while protruding in a width direction of the negative electrode.

4. The electrode assembly of claim 3, wherein the positive electrode is shorter than the negative electrode so that the winding of the positive electrode starts later than the winding of the negative electrode when the winding of the negative electrode, the first separator, the positive electrode, and the second separator starts, and
    wherein the winding of the positive electrode is completed earlier than the winding of the negative electrode.

5. The electrode assembly of claim 4, wherein the winding is performed so that first and second ends of the positive electrode are spaced certain distances from the first and second negative electrode collector-exposed portions, respectively.

6. The electrode assembly of claim 1, wherein the positive electrode includes a positive electrode active material on a surface of a positive electrode collector and has, formed therein, a positive electrode collector-exposed portion that is not coated with the positive electrode active material to expose the surface of the positive electrode collector, and
  wherein the positive electrode collector-exposed portion is disposed between two regions of the positive electrode collector coated with the positive electrode active material.

7. The electrode assembly of claim 6, wherein an area of the positive electrode collector-exposed portion is less than the area of the first negative electrode collector-exposed portion and is greater than the area of the second negative electrode collector-exposed portion.

8. The electrode assembly of claim 6, wherein the positive electrode collector-exposed portion is disposed closer to the first negative electrode collector-exposed portion than to the second negative electrode collector-exposed portion.

9. A secondary battery in which the jelly-roll type electrode assembly of claim 1 is accommodated in a case.

10. A method for manufacturing an electrode assembly which is manufactured by winding a negative electrode, a first separator, a positive electrode, and a second separator around a winding core, the method comprising:
  a negative electrode rotating step (S1) of inputting a negative electrode onto the first separator and allowing the negative electrode to rotate such that rotation around the winding core is performed from a starting end of the negative electrode; and
  a positive electrode inputting step (S2) of inputting a positive electrode onto the second separator after the rotation of the negative electrode starts and thereby allowing the positive electrode to rotate together with the negative electrode,
wherein the negative electrode is manufactured by applying a negative electrode active material to a surface of a negative electrode collector,
wherein a first negative electrode collector-exposed portion, which is not coated with the negative electrode active material to expose the surface of the negative electrode collector, is formed in the starting end fixed to the winding core, and a negative electrode tab is bonded to the first negative electrode collector-exposed portion,
wherein a second negative electrode collector-exposed portion is formed in a terminal end of the negative electrode opposite from the starting end,
wherein, in the negative electrode rotating step (S1), the rotation starts from the first negative electrode collector-exposed portion to the second negative electrode collector-exposed portion, and
wherein the first negative electrode collector-exposed portion has a larger area than an area of the second negative electrode collector-exposed portion.

* * * * *